(12) United States Patent
Collins et al.

(10) Patent No.: US 8,020,808 B2
(45) Date of Patent: Sep. 20, 2011

(54) AIRCRAFT SUBASSEMBLY AND AIRCRAFT COMPRISING SUCH A SUBASSEMBLY

(75) Inventors: Alexandra Collins, Geneva (CH); Mark Collins, Geneva (CH)

(73) Assignee: Airbus, Blagnac (FR)

( * ) Notice: Subject to any disclaimer, the term of this patent is extended or adjusted under 35 U.S.C. 154(b) by 794 days.

(21) Appl. No.: 11/848,367

(22) Filed: Aug. 31, 2007

(65) Prior Publication Data

US 2008/0120785 A1 May 29, 2008

Related U.S. Application Data

(60) Provisional application No. 60/850,634, filed on Oct. 11, 2006.

(30) Foreign Application Priority Data

Aug. 31, 2006 (FR) ...................................... 06 53538

(51) Int. Cl.
- *B64D 11/00* (2006.01)
- *B60N 2/42* (2006.01)
- *A47C 13/00* (2006.01)

(52) U.S. Cl. ................. 244/118.5; 297/411.31; 297/118

(58) Field of Classification Search ............... 244/118.5; 297/411.31, 118.08, 118.01; 248/185.1, 248/118.3, 108, 297, 118.5; 5/507.1, 121
See application file for complete search history.

(56) References Cited

U.S. PATENT DOCUMENTS

| | | | | |
|---|---|---|---|---|
| 2,193,647 A * | 3/1940 | Rush et al. | ...................... | 108/49 |
| 2,535,112 A * | 12/1950 | Woody | ........................... | 312/233 |
| 2,605,155 A * | 7/1952 | Lewis | ........................... | 108/139 |
| 2,635,680 A * | 4/1953 | Zentmire | ...................... | 297/144 |
| 2,709,818 A * | 6/1955 | Freese | ........................... | 5/507.1 |
| 2,904,798 A * | 9/1959 | Heflin | ............................. | 5/621 |
| 3,086,226 A * | 4/1963 | Kyser et al. | ................... | 5/507.1 |
| 3,535,720 A * | 10/1970 | Woods | ........................... | 5/507.1 |
| 3,618,145 A * | 11/1971 | Rowe | ............................. | 5/507.1 |
| 4,524,475 A * | 6/1985 | Valentino | ...................... | 5/507.1 |
| 4,780,919 A * | 11/1988 | Harrison | .......................... | 5/600 |
| 5,035,464 A * | 7/1991 | Spallholtz | ..................... | 297/144 |
| 5,221,070 A | 6/1993 | Heilmer | | |
| 5,547,247 A * | 8/1996 | Dixon | ........................... | 297/145 |
| 6,074,000 A * | 6/2000 | Wagner | .................... | 297/188.11 |
| 6,170,786 B1 | 1/2001 | Park et al. | | |
| 6,427,957 B1 | 8/2002 | Finneman et al. | | |
| 6,691,952 B2 * | 2/2004 | Keogh | ........................ | 244/118.5 |
| 6,793,281 B2 * | 9/2004 | Duerr et al. | ................... | 297/147 |
| 2005/0012375 A1 | 1/2005 | Giasson | | |

\* cited by examiner

*Primary Examiner* — Tien Dinh

(74) *Attorney, Agent, or Firm* — Oblon, Spivak, McClelland, Maier & Neustadt, L.L.P.

(57) ABSTRACT

An aircraft subassembly including a shelf combined with a longitudinal banquette for a passenger, a mechanism for moving the shelf along one of the two longitudinal sides of the banquette.

20 Claims, 4 Drawing Sheets

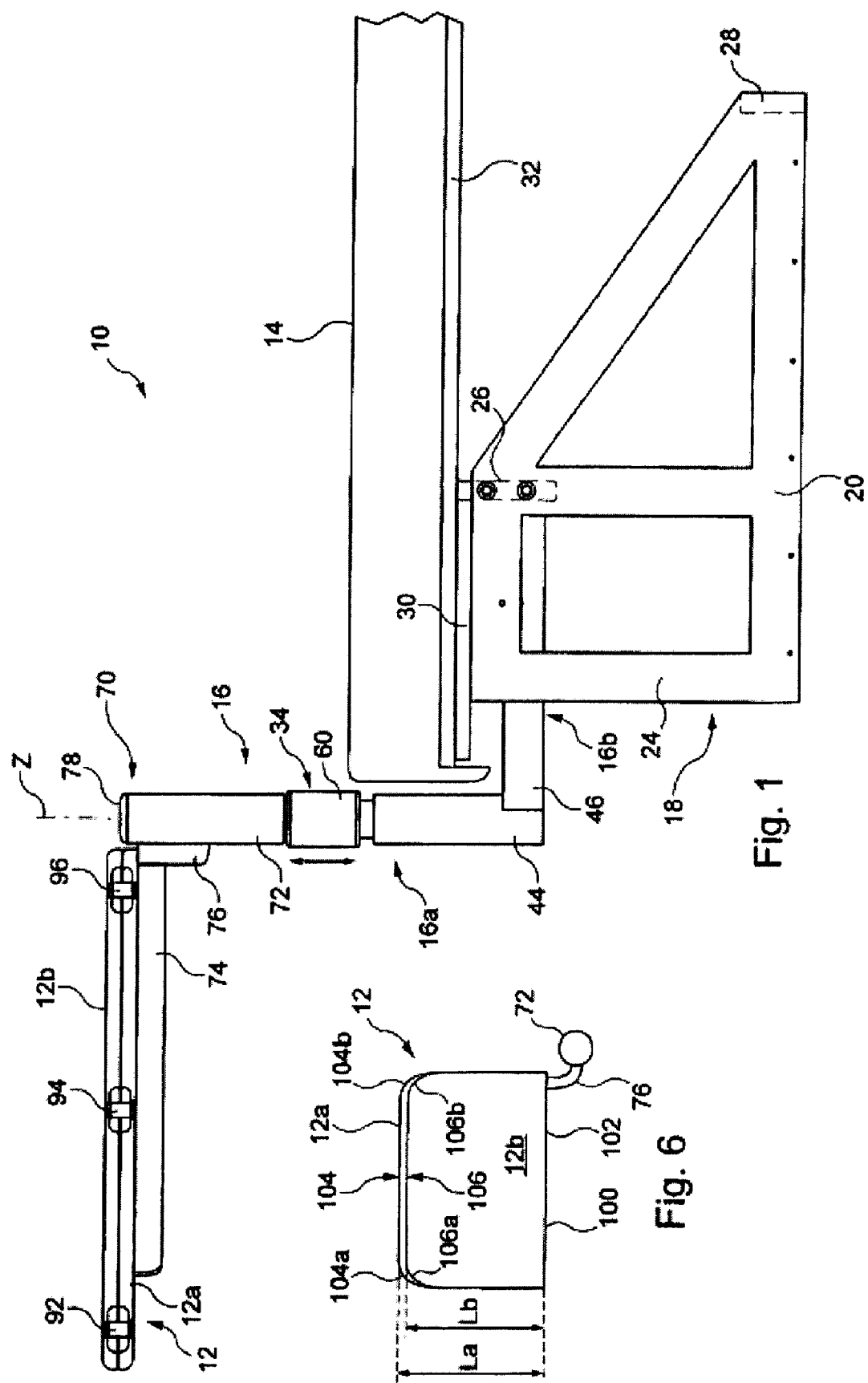

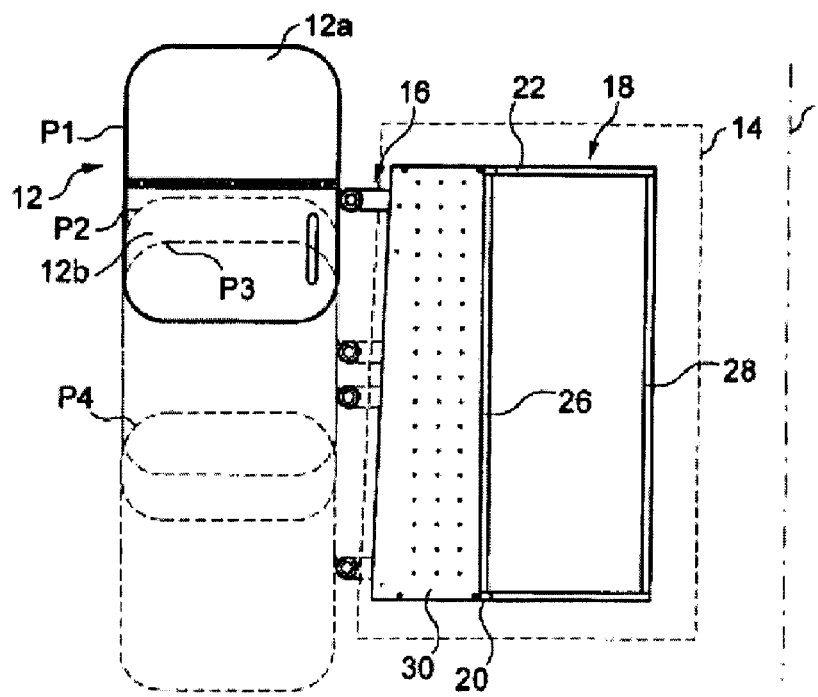
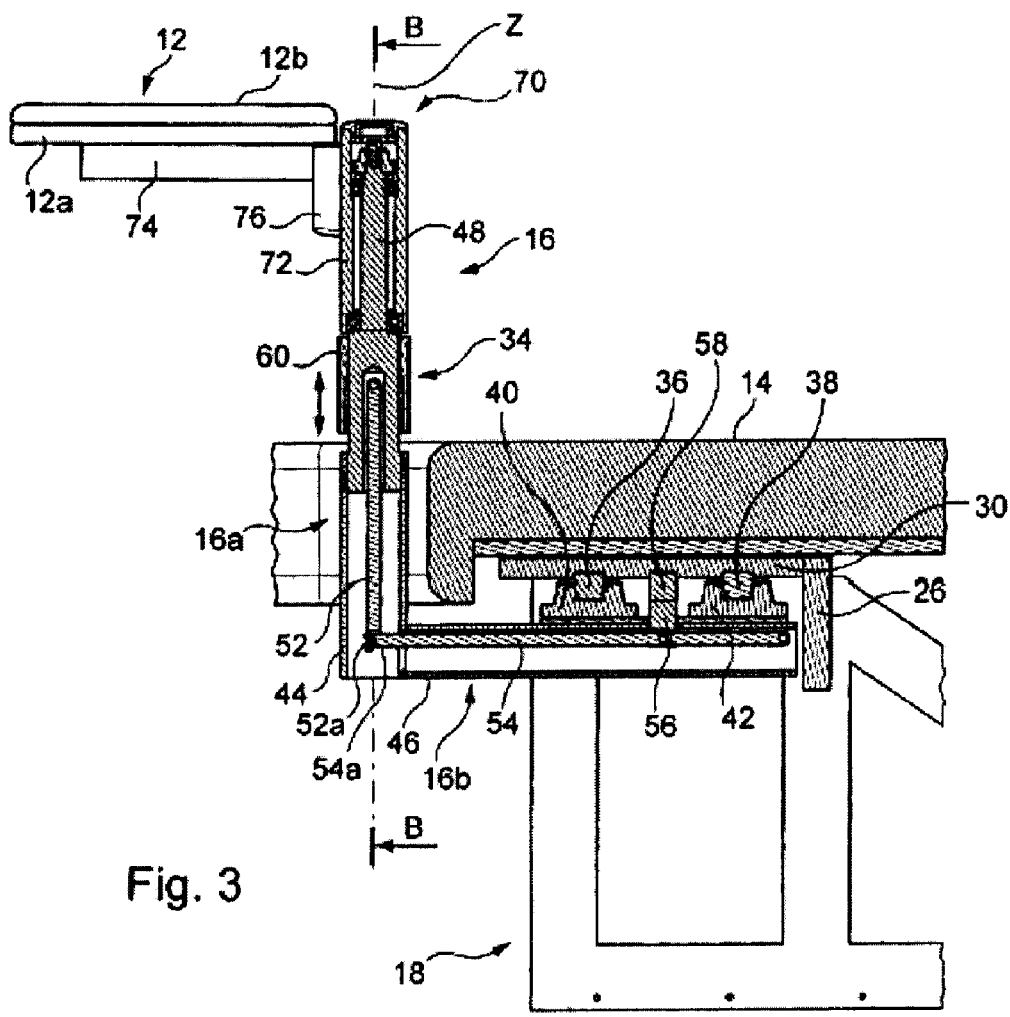

(C-C)

(B-B)

AIRCRAFT SUBASSEMBLY AND AIRCRAFT COMPRISING SUCH A SUBASSEMBLY

BACKGROUND OF THE INVENTION

1. Field of the Invention

The invention relates to an aircraft subassembly.

2. Discussion of the Background

On commercial aircraft flights, particularly in the so-called higher classes (first classes, "business" classes . . . ), the passengers are given special attention by the aircraft manufacturers.

The latter provide, in particular, more space than for the passengers in the so-called "economy" classes and, as a general rule, offer more and more services to enhance passenger comfort.

The passengers in the higher classes thus can tilt their seat into a more or less horizontal position, sometimes even convert their armchair into a bed or banquette, because the seats positioned in front and behind are sufficiently spaced apart.

The seats also are spaced apart laterally from each other in order to provide more space to the passengers.

Moreover, in certain aircraft, spaces are provided to accommodate banquettes or beds in order to provide the passengers with preferential rest spaces.

When the passengers are settled in lying-down position on their banquette or their bed, which is a matter of a seat converted into a banquette or into a bed or else a permanent banquette or bed, they very often have need of a shelf on which to place, for example, a meal plate or a drink, a magazine, a portable computer . . . .

In known manner, in the passenger seats of the higher classes, a shelf generally is accommodated inside one of the armrests of the seat and can be opened out if the need arises.

Such a shelf, however, generally is not suited to a banquette or a bed.

In addition, the fact that the shelf must be accommodated in a small-sized space inside the armrest imposes constraints on its design.

In fact, for example, the possible movements of the shelf once in a position for use in front of the passenger are limited in space, from the point of view of their amplitude as well as the possible degrees of freedom.

The size of the shelf itself very often also is reduced because of the small amount of space set aside for its accommodation in the armrest.

Furthermore, the shelf is not suited to bearing heavy loads because of its design in several linked parts which all must be accommodated in the armrest.

SUMMARY OF THE INVENTION

This invention is intended to remedy at least one of the aforementioned drawbacks by proposing an aircraft subassembly characterized in that it comprises:
 a shelf combined with a longitudinal banquette for a passenger,
 means for movement of the shelf along one of the two longitudinal sides of the banquette.

By arranging the shelf so as to be able to move it longitudinally in relation to the banquette, the subassembly according to the invention is perfectly suited to the banquettes and, furthermore, imparts to the shelf a degree of freedom that did not exist previously.

Moreover, the longitudinal movement takes place over a large portion of the longitudinal dimension of the banquette or even over the entirety thereof, which provides more possibilities of movement for the passenger.

It will be noted that the longitudinal direction of the banquette is not necessarily the same as the longitudinal direction of the aircraft. In fact, the banquette can be positioned transversely to the longitudinal direction of the cabin, or even assume an intermediate position between the longitudinal and transverse axes of the cabin.

According to one characteristic, the aircraft subassembly also comprises means for pivoting of the shelf in relation to the banquette, which makes it possible to provide the passengers with another degree of freedom in addition to the translation of the shelf.

According to one characteristic, the means for pivoting are mechanically independent of the means for longitudinal movement.

This brings a greater ease of use for the passenger and also facilitates the design of the subassembly.

According to one characteristic, the shelf occupies a plurality of discrete stable positions in the course of its movement, where previously there very often were only two extreme and occasionally non-stable positions.

In fact, in one of these extreme positions, it happened that in the prior art the shelf could shift as a result of an inopportune movement of the user.

According to one characteristic, the aircraft subassembly comprises at least one locking/unlocking mechanism movable between an initial locked position, in which a movement of the shelf is prevented, and a second unlocked position, in which this movement is allowed.

This makes it possible to ensure that the shelf does not shift any more as soon as the passenger has placed it in a position for use.

According to one characteristic, the subassembly comprises at least one elastic mechanism ensuring the elastic return of the mechanism to its initial position in the absence of outside prompting on the mechanism.

Thus the user does not need to engage a locking mechanism himself in order to block the shelf in position after having selected the latter, because the mechanism locks on its own.

According to one characteristic, the said at least one locking/unlocking mechanism is a first mechanism movable between an initial locked position, in which the longitudinal movement of the shelf is prevented, and a second unlocked position in which this movement is allowed.

Thus, a specified mechanism is dedicated to the longitudinal movement of the shelf.

According to one characteristic, the said at least one locking/unlocking mechanism is a second mechanism movable between an initial locked position, in which the pivoting of the shelf is prevented, and a second unlocked position, in which this movement is allowed.

There also, for the rotational movement of the shelf, a specific mechanism is dedicated thereto.

According to one characteristic, the shelf is mounted on a support movable in translation in relation to the banquette.

According to one characteristic, the shelf is mounted in rotating manner in relation to the support.

According to one characteristic, the said at least one locking/unlocking mechanism is arranged on the support.

According to one characteristic, the support, projecting in a plane perpendicular to the longitudinal direction of the banquette, is generally square shaped and comprises a first portion of elongated form along a direction more or less perpendicular to the plane of the banquette and a second portion more or less parallel to the plane of the banquette and arranged at least partially underneath the said banquette.

This form of support allows the subassembly to take up little space, because a large portion of the support is arranged underneath the banquette, thus imparting a considerable compactness to the subassembly.

In addition, the form of the first portion of the support does not reduce the amount of lateral space around the banquette and thus also contributes to imparting a reduced space requirement to the subassembly.

According to one characteristic, the first mechanism comprises at least one movable locking device fastened on the second portion of the support and which, in its initial position, engages with a complementary device integral with a fixed frame in relation to which the support can be moved in translation with a view to preventing this movement.

This device acts as a transverse stop for the support.

According to one characteristic, the first mechanism comprises a working device arranged on the first part of the support and which is connected to the said at least one locking/unlocking device by a set of movable parts, the activation of the working device from its first to its second position bringing about the movement of the set of parts and the disengagement of the locking device from the complementary device.

The simple manipulation of the working device by the user therefore makes it possible to unlock the first mechanism and thus to move longitudinally the support and the shelf that is secured thereto.

According to one characteristic, the movement of the working device is effected along the elongated direction of the first portion of the support, which represents a movement easy to make for the user settled on the banquette.

According to one characteristic, the working device comprises a sliding collar surrounding the first portion of the support.

According to one characteristic, the second mechanism comprises an activation component arranged at a so-called upper end of the first portion of the support and connected to a first axially movable part which, in the initial position of the mechanism, is engaged with a second part integral with the shelf, thus preventing any pivoting movement of the second part in relation to the first, the movement of the activation component bringing about the axial movement of the first part and disengagement thereof from the second part, thus allowing the aforementioned pivoting movement.

The second mechanism thus comprises a rotational stop countering the pivoting movement of the shelf and which can be released on command.

According to one characteristic, the activation component is a push-button, which has the advantage of being particularly simple for a user to operate.

According to one characteristic, the means for translational movement of the support comprise at least one rail set cooperating with a component forming a carriage arranged one on the support and the other on a fixed frame positioned underneath the banquette.

It is a matter of means particularly simple to operate, in order to provide for the sliding of the support in relation to the banquette.

According to one characteristic, the shelf comprises two demi-trays joined together by means forming a hinge and that can be arranged one above the other in a folded-up position of the shelf.

Thus, when the shelf is not being used, it provides a reduced space requirement in folded-up position.

In open position, the two demi-trays provide the passenger with a large use surface.

According to one characteristic, at least one of the dimensions of one of the demi-trays is less than that of the other tray in order to facilitate prehension of the upper demi-tray with a view to its opening out in unfolded position of the shelf.

The user thus can place the shelf in use position in simple manner and without hurting himself.

According to one characteristic, the demi-trays each have, on the one hand, a straight side along which the means forming a hinge are arranged and, on the other hand, a partially straight opposite side between the two opposite ends of this side, each end having a rounded form with a given radius of curvature, the radius of curvature of at least one of the ends of one demi-tray being greater than the radius of curvature of the corresponding end of the other demi-tray placed opposite in folded-up position of the shelf.

This constitutes an embodiment particularly simple to implement in order to facilitate prehension of the upper demi-tray in relation to the lower demi-tray.

The invention also relates to an aircraft that comprises one or more aircraft subassemblies in accordance with what has just been described.

BRIEF DESCRIPTION OF THE DRAWINGS

Other characteristics and advantages will emerge during the description that is going to follow, given solely by way of non-limitative example and presented with reference to the attached drawings, on which:

FIG. 1 is a general schematic view showing the aircraft subassembly according to one example of embodiment;

FIG. 2 is a schematic view from above of the subassembly of FIG. 1 on which the banquette 14 has been depicted in dotted lines for the sake of clarity and the different successive longitudinal positions of the shelf also have been depicted in dotted lines;

FIG. 3 is a schematic view in cross section of the subassembly of FIG. 1;

FIG. 6 schematically illustrates the shelf 12 in folded-up position;

DETAILED DESCRIPTION OF THE PREFERRED EMBODIMENTS

Figure 5:
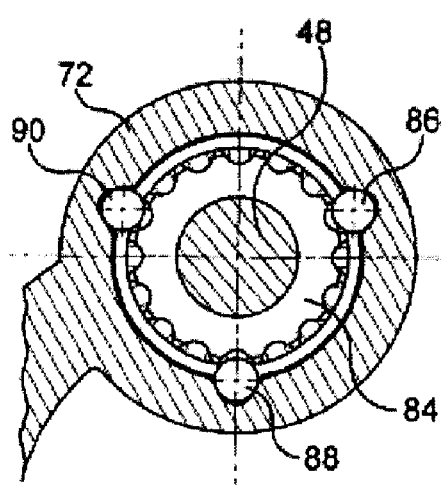
FIG. 5 is a schematic view in cross section along C-C of FIG. 4.

The invention relates to a subassembly or module intended to be installed in an aircraft.

As depicted in FIG. 1 and designated by the general reference marked 10, such a subassembly (cabin layout) comprises a table or shelf 12 arranged adjacent to a banquette 14 that is extended along a longitudinal direction perpendicular to the plane of FIG. 1.

This longitudinal direction of the banquette corresponds, for example, to the longitudinal direction of the aircraft cabin in which it is installed.

Other arrangements, however also are conceivable (transverse or oblique).

The banquette 14 is intended to accommodate a passenger who may be in lying-down or seated position thereon.

More particularly, the shelf 12 is combined with the banquette 14 in the sense that, with the latter, it forms part of the aircraft subassembly 10, and it is intended to be used by a passenger occupying the banquette.

It will be noted that the banquette 14 can be installed permanently in the aircraft or else be the result of the conversion of a passenger seat into a horizontal or more or less horizontal sitting surface, thus constituting a banquette or a bedding arrangement.

The shelf 12 is movable in relation to the banquette and can occupy several successive geometric positions in the course of time, thus enhancing passenger comfort.

The shelf 12 in particular can be moved according to a longitudinal translation along the banquette 14 along the X axis (FIG. 2).

The shelf thus can occupy several discrete stable positions, in the course of its movement in longitudinal translation.

Moreover, the shelf also is capable of effecting a pivoting movement in relation to the banquette and thus can come to occupy a plurality of discrete stable positions in the course of its rotational movement.

For this purpose, the aircraft subassembly 10 comprises means for movement of the shelf in translation, and in pivoting, which will be described later. It will be noted that these means are mechanically independent of one another, in order to provide the passengers with a greater ease of use. This independence of the systems increases the number of possible positions for each movement.

In addition, the two movements of a different nature can be effected simultaneously or one after the other, according to preference, because of the mechanical independence of the systems.

Furthermore, for each of the longitudinal positions of the shelf, the latter can assume different angular positions after pivoting.

As depicted on FIG. 1, the shelf 12 is, for example, mounted on a support 16 that is capable of moving in longitudinal translation in relation to the banquette under the action of appropriate driving means.

Moreover, the shelf 12 is mounted in rotating manner in relation to the support and therefore in relation to the banquette 14 with the aid of appropriate driving means.

It will be noted that the driving means for the shelf in rotation and the driving means in translation are arranged on difference zones of the support 16 as will be seen subsequently, which ensures their mechanical independence.

The support 16 is mounted in sliding manner in relation to a frame 18 forming a fixed stand serving as support for the banquette 14 placed above.

The frame 18 comprises two lateral uprights 20, 22 spaced apart from one another along the longitudinal direction of the X axis and which are joined together by longitudinal crosspieces 24, 26 and 28 (FIGS. 1 and 2).

A horizontal base 30 is fastened to each of the lateral uprights 20 and 22 in their upper portion.

A plank 32 is interposed between the banquette 14 and the base 30.

As will be seen subsequently, the support 16 is secured to the frame 18 by means of the base 30.

Thus, the shelf support is suspended and therefore does not take up the clear space on the floor of the cabin, which is particularly advantageous in an aircraft, where space often is lacking.

As depicted on FIG. 1, the support 16 is generally square- or L-shaped, the shelf 12 being fastened to one end of the support, while the latter is joined to the fixed frame on the side of the opposite end of the said support.

The support comprises a first portion 16a of general elongated form along a vertical direction of the Z axis more or less perpendicular to the plane of the banquette and a second portion 16b more or less parallel to the plane of the banquette.

This second portion 16b is arranged mainly underneath the banquette in order, on the one hand, to conceal and, on the other hand, to reduce the congestion of the space around the banquette and thus to increase the compactness of the subassembly.

It will be noted that the first elongated portion 16a of the support has, for example, a general cylindrical shape.

The longitudinal movement of the table and the support, as well as the rotational movement of the table in relation to the support, is controlled by activation of a specific locking/unlocking mechanism appropriate for each movement.

More particularly, the aircraft subassembly according to the invention comprises a first locking/unlocking mechanism 34 that is movable between an initial so-called locked position, in which translational movement of the support (and therefore of the shelf) is prevented, and a second unlocked position in which this movement is allowed.

This first mechanism makes it possible, on command, to activate the means for translational movement of the support 16.

These means depicted in cross section on FIG. 3 comprise two longitudinal rails 36, 38 fastened on the lower portion of the base 30 and which cooperate respectively with two components 40, 42 forming a carriage fastened on the second horizontal portion 16b of the support.

The components forming a carriage thus are capable of sliding along the longitudinal rails when the first mechanism is unlocked (second position).

In its first vertical portion 16a, the support 16 includes a zone located in the lower portion that comprises a hollow component 44 of a more or less cylindrical shape.

The second horizontal portion 16b of the support also includes a hollow component 46 (for example with square or rectangular section) that is fastened at a right angle to the component 44 so as to allow a communication between the two inner spaces of the said components.

Figure 4:
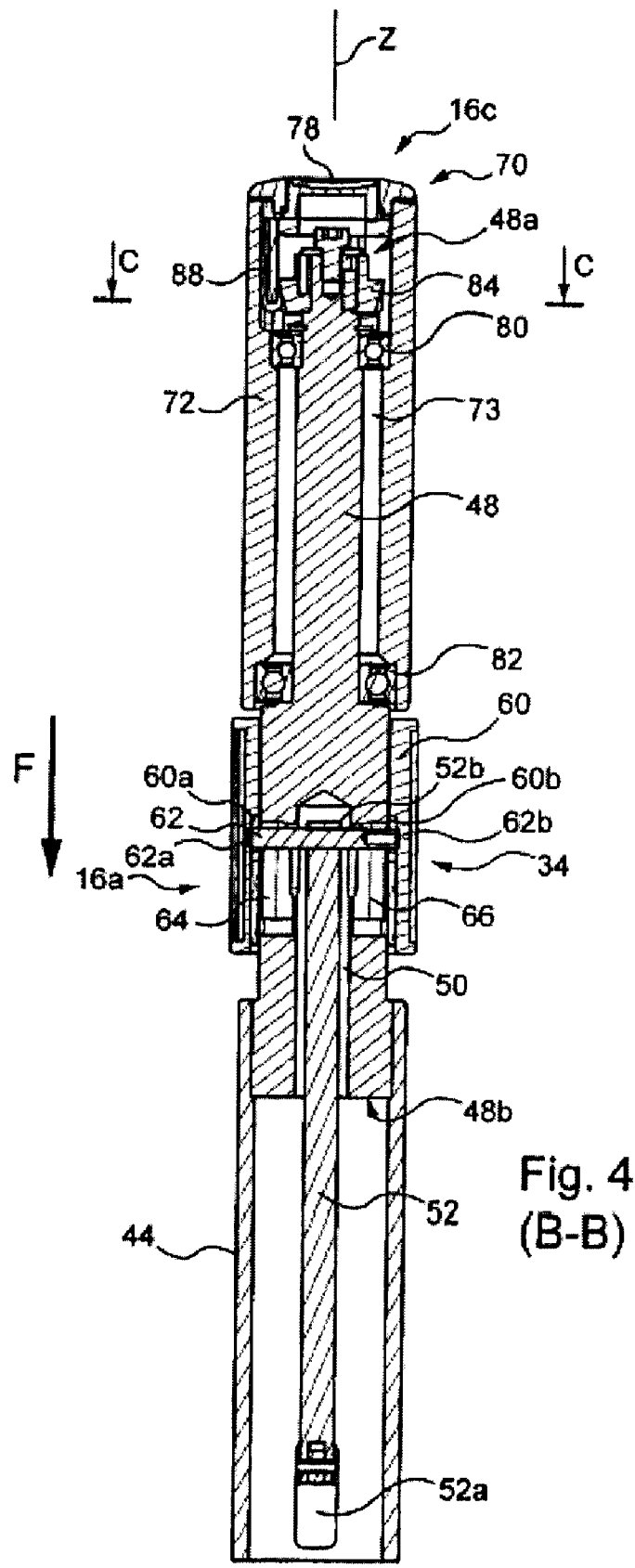
FIG. 4 is an enlarged partial schematic view in section along B-B of a portion of the support illustrated in FIG. 3.

The support 16 comprises an elongated internal part 48 forming a central hub that extends over a great length of the first portion 16a, from an upper end 48a close to the upper end 16c of the support to a lower end 48b that penetrates into the interior of the component 44 (FIG. 4).

A cylindrical central housing 50 is provided in the lower portion of larger diameter of the hub 48 to accommodate a movable part or rod 52.

This part is arranged inside the hollow component 44 and can slide there along the Z axis.

Another movable part 54 (FIG. 3) is arranged inside the perpendicular hollow component 46 and these two parts are fastened to one another by one of their respective ends 52a, 54a.

This set of movable parts 52, 54 forms part of the first mechanism 34.

The first mechanism also comprises a locking/unlocking device 56 that is mounted in fixed manner on the rod 54 between the two sets of rails and carriages. This device is intended to cooperate by engagement with a complementary locking device 58 integral with the lower portion of the base 30 in order to lock the first mechanism 34 in its initial position and thus to prevent movement of the support and therefore of the shelf.

The locking devices 56 and 58 are complementary to one another and function as two complementary parts of a gearing (tooth/pinion) or two complementary parts of an assembly of the mortise and tenon type.

In the position illustrated on FIG. 3, the devices 56 and 58 are engaged with one another to lock the mechanism and also ensure a stable longitudinal position of the support.

As depicted in more detail on FIG. 4, a working device 60 of the first mechanism 34 is arranged on the first portion 16a of the support, for example in its central zone and, more particularly, on the enlarged, more solid portion of the central hub 48.

This working device comes, for example, in the form of a sliding collar surrounding a portion of the central hub 48 and which is capable of sliding around the latter under the action of an external prompting directed along the Z axis (Z axis depicted on FIGS. 3 and 4).

It will be noted that the working device is arranged above the banquette 14 so as to be able to be activated simply and without excessive effort by a passenger occupying same (FIG. 1).

The working device 60 is connected to the locking/unlocking device 56 by the set of movable parts or rods 52, 54.

In addition, a pin 62 is arranged transversely in relation to the Z axis, and crosses the end 52b of the movable part 52. This connecting component 52 has a length greater than the diameter of the central hub 48 so as to project in relation to the outer surface of the hub with its two opposite ends 62a and 62b.

Two longitudinal hollows 60a, 60b are provided on the inner surface of the working device 60 in order to accommodate the corresponding ends 62a and 62b of the fastening component 62.

Two diametrically opposed ports 64, 66 are implemented in the peripheral surface of the central hub 48 surrounding the housing 50, in order to accommodate the fastening component 62 during its downward movement.

Thus, when the working device 60 is moved along the Z axis as indicated by the arrow identified as F on FIG. 4, the fastening component 62 secured to the movable part 52 is carried along in this downward movement, the same as this part 52.

This has the effect of also bringing about the vertical downward movement of the connected part 54 and therefore the uncoupling of the locking device 56 from the complementary device 58.

The support therefore is not impeded by a transverse stop in its longitudinal movement.

By so prompting the first mechanism 34 by means of the working device 60, this mechanism is moved from its initial position to its second position, which then makes it possible to push the support along the X direction (FIG. 2) to the position desired by the user.

It will be noted that several devices 58 (for example implemented in the form of grooves) are arranged longitudinally along the length of the base 30 (between the uprights 20 and 22) in order to constitute a plurality of discrete, stable longitudinal positions for the support when the locking/unlocking device 56 (for example implemented in the form of a tooth) comes to be inserted therein.

Furthermore, it will be noted that one or more elastic devices (not depicted) are combined with the first mechanism 34 so as to counter the movement imposed by the force symbolized by the arrow F.

Thus, the user operating the device 60 must overcome the force exerted by the elastic devices that tend to counter the downward movement of this device 60. When the user ceases to exert a sufficient outside prompting on the device 60, the elastic device or devices then ensure the elastic return of the mechanism 34 to its initial position (longitudinal blockage of the support 16).

The devices may take the form, for example, of one or more springs arranged in the axial ports 64 and 66 or in the peripheral hollows 60a and 60b.

A second locking/unlocking mechanism 70 is arranged on the first portion 16a of the support, in particular in its upper portion close to the end 16c (FIG. 4).

The first portion 16a of the support comprises in its upper portion located above the working device 60 a more or less cylindrical part 72 forming a sleeve that surrounds the central hub 48 in its portion with reduced diameter (FIG. 4).

The shelf 12 rests on a support component 74 that is connected to the sleeve 72 by means of a curved arm 76 (FIGS. 1 and 3).

The unit made up of the shelf, the component forming a support 74, the arm 76 and the sleeve 72 form an interdependent block.

Inside the sleeve 72 (FIG. 4), a ring-shaped space 73 is left clear between the latter and the central hub. Two sets of bearings 80, 82 are arranged in this space at points sufficiently spaced apart from one another to ensure a good rotational movement of the sleeve in relation to the central hub 48 when the second mechanism 70 is unlocked.

At the upper end 16c of the support, there is arranged an activation component 78 implemented, for example, in the form of a push-button. This component is arranged in the inner space 73 defined by the outer sleeve 72 and the central hub 48 and forms the upper portion of the support 16.

This component 78 comprises a part 84 having a symmetry of revolution and that is depicted in more detail in cross section on FIG. 5.

This part has a series of peripheral teeth or grooves (for example three in number) some of which are engaged with cylindrical rods in corresponding number pinpointed with the references 86, 88 and 90 on FIG. 5.

These rods are arranged in notches of corresponding form provided on the inner surface of the sleeve 72 and are integral with the latter.

In the position depicted on FIGS. 3 and 4, the part 84 that takes on the form of a toothed crown cooperates with the rods 86, 88 and 90 integral with the sleeve, thus blocking any rotational movement of the said sleeve in relation to the part 84 and the hub 48.

This position corresponds to the initial position of the second mechanism 70 that ensures locking (by an angular stop) of the shelf in a defined angular position.

On the other hand, when the activation component 78 is prompted along the Z axis according to a downward force (pushing force of the user), the toothed crown 84 integral with this element is moved in a corresponding manner along this Z axis and the teeth or grooves of the latter end up underneath parts 86, 88 and 90, thus unlocking the mechanism that prevented any pivoting movement.

In this second position of the second mechanism 70, the sleeve is free to pivot around the fixed central hub 48 in rotation under the action of an external prompting exerted on the shelf by a user and which then can impart the desired angular position thereto.

It will be noted that when the external prompting action exerted on the activation component 78 ceases, one or more elastic devices exert a force on the toothed crown 84 to cause it to go back up along the Z axis and thus bring about the reengagement of the teeth or grooves of the latter with the parts 86, 88 and 90 forming angular stops.

Considering the plurality of teeth or grooves of this crown, it is understood that the sleeve and therefore the shelf can occupy a plurality of discrete stable positions over the course of time.

Each position is stable inasmuch as, after pivoting of the shelf, when the user relaxes the pressure on the button 78, the mechanism reverts to blockage position, which prevents any undesired rotational movement.

As depicted on FIGS. 1 to 3, the shelf 12 includes two demi-trays 12*a* and 12*b* that are linked with one another by way of means 92, 94, 96 forming a hinge.

These two demi-trays can be superposed in a folded-up position of the shelf as illustrated on FIGS. 1 and 3.

In a view from above on FIG. 6, the shelf has been depicted in folded up position with the two demi-trays arranged one above the other, the demi-tray 12*b* constituting the upper demi-tray and the demi-tray 12*a* constituting the lower demi-tray.

In order to facilitate the prehension of the upper demi-tray 12*b* with a view to its opening out in the unfolded out position of the shelf as depicted on FIG. 2 (horizontal shelf), it is provided that at least one of the dimensions of one of the two demi-trays is less than that of the other demi-tray.

Thus, as depicted on FIG. 6, the dimensions of the upper demi-tray 12*b* are less than that of the lower demi-tray 12*a* in order to allow the user to introduce his fingers between the demi-trays and to raise the upper demi-tray.

Alternatively, at least one of the dimensions of the lower demi-tray 12*a* can be less than that of the upper demi-tray in order to facilitate the operation of the shelf.

More particularly, the dimension Lb of the upper demi-tray 12*b* (length) is less than the dimension La of the lower demi-tray 12*a*.

Alternatively, the dimension of the demi-trays perpendicular to the length, namely the width, can differ from one demi-tray to another.

In the example of embodiment illustrated in FIG. 6, each demi-tray has a straight side: the side 100 for the lower demi-tray 12*a* and the side 102 for the upper demi-tray 12*b* along which the different means 92, 94 and 96 are fastened.

Moving along the length of the demi-trays, there is found an opposite side 104 for the lower demi-tray 12*a* and 106 for the upper demi-tray 12*b*, which each are partially straight and which have at their respective opposite ends, 104*a* and 104*b* for the side 104 and 106*a* and 106*b* for the side 106, an edge of rounded form along a given radius of curvature.

Thus, the radius of curvature of the rounded edges or ends 106*a* and 106*b* is less than the radius of curvature of the corresponding rounded ends or edges 104*a* and 104*b* of the other demi-tray positioned opposite when the shelf is in folded-up position (FIG. 6).

For example, the radius of curvature of the edges 106*a*, 106*b* is equal to 100 mm, while that of edges 104*a*, 104*b* is equal to 120 mm.

As illustrated in dotted lines on FIG. 2, the shelf can assume several successive longitudinal positions along one of the two longitudinal sides of the banquette 14 by translational movement.

By way of example, a plurality of discrete successive positions P1, P2, P3 and P4 of the shelf has been depicted.

It will be noted that for each of these positions, the support 16 is in a stabilized position in relation to the fixed frame 18 inasmuch as for each of these positions, the locking device 56 cooperates with the complementary fixed device 58 linked to the frame and blocks any untimely sliding movement.

Figure 7:
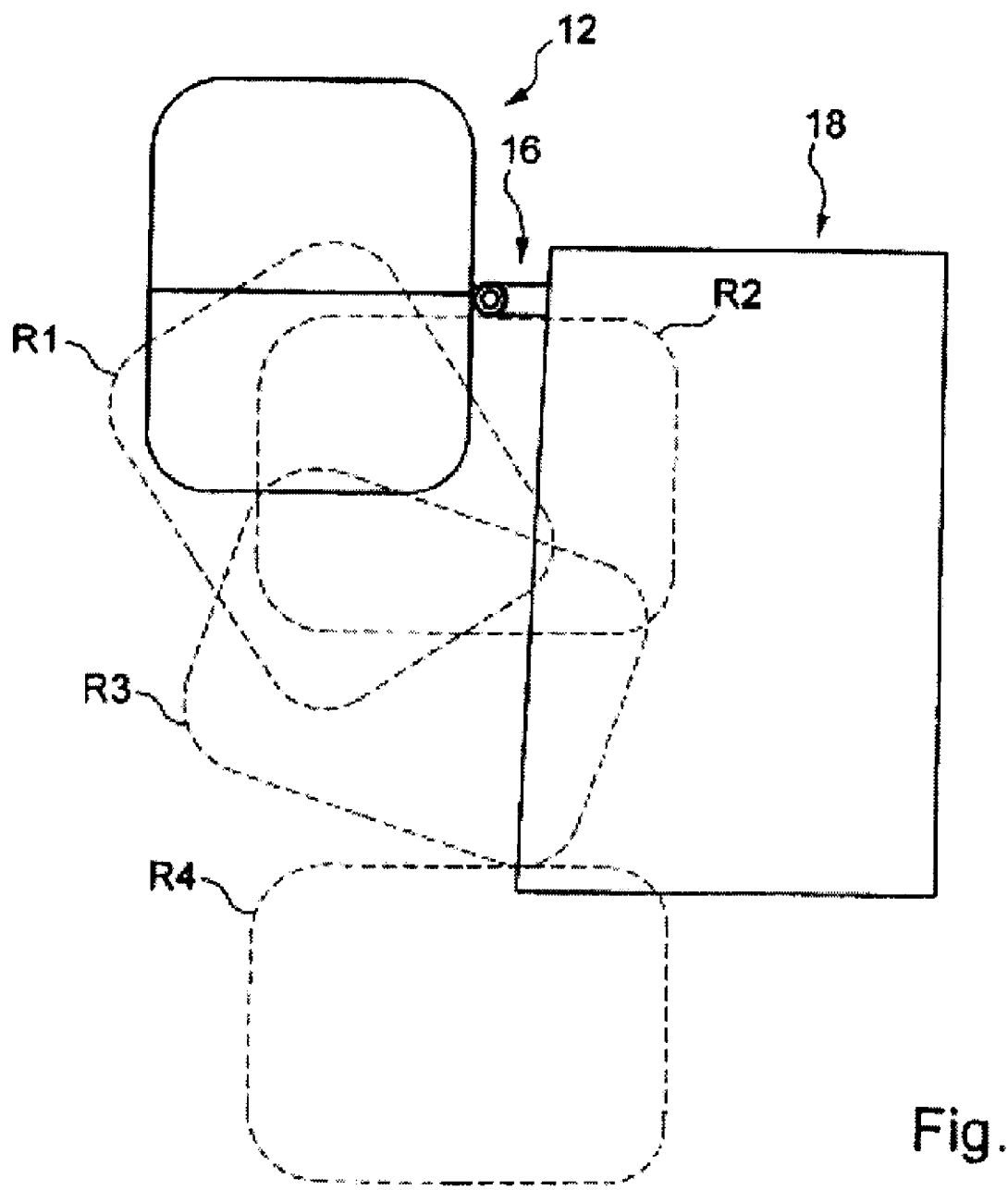
FIG. 7 schematically illustrates different successive angular positions of the shelf 12.

There also have been depicted in dotted lines on FIG. 7 different discrete stable angular positions R1, R2, R3, R4 of the shelf 12 as a result of a pivoting movement of the latter in relation to the support 16 and therefore in relation to the banquette.

It will be noted in this connection that the shelf can be turned by a user even in folded up position.

In addition, the first and second mechanisms 34 and 70 are simple to operate and can be controlled easily by a user seated or lying down without, however, requiring an overly great effort.

The invention claimed is:

1. An aircraft subassembly, comprising:
   a banquette for a passenger, said banquette being dimensioned and configured to receive said passenger in a lying-down position on a horizontal top surface of said banquette, said banquette defining two longitudinal sides parallel to each other and two transverse sides parallel to each other, said longitudinal sides being longer than said transverse sides;
   a shelf mechanically coupled to said banquette, said shelf having, at least in an open position of said shelf, a tray surface oriented horizontally;
   means for moving the shelf with a translational movement along one of the two longitudinal sides of the banquette while said tray surface is oriented horizontally;
   a first locking/unlocking mechanism that is movable between an initial translational locked position, in which the translational movement of the shelf is prevented, and a second translational unlocked position, in which the translational movement is allowed; and
   at least one elastic device ensuring elastic return of the first locking/unlocking mechanism to the initial translational locked position in an absence of outside prompting on the first locking/unlocking mechanism.

2. The aircraft subassembly according to claim 1, further comprising means for pivoting the shelf in relation to the banquette while said tray surface is oriented horizontally.

3. The aircraft subassembly according to claim 2, wherein the means for pivoting are mechanically independent of the means for moving the shelf with the translational movement.

4. The aircraft subassembly according to claim 2, wherein said means for moving the shelf with said translational movement and said means for pivoting include means for presenting a plurality of discrete stable positions in the course of pivoting and moving with said translational movement.

5. The aircraft subassembly according to claim 2, further comprising a second locking/unlocking mechanism movable between an initial pivoting locked position, in which pivoting the shelf is prevented, and a second pivoting unlocked position, in which pivoting the shelf is allowed.

6. The aircraft subassembly according to claim 5, further comprising:
   a support, the shelf being mounted on the support; and
   means for moving the support in translation in relation to the banquette,
   wherein the support is L-shaped and projects in a plane perpendicular to the longitudinal sides of the banquette, the support including a first portion elongated along a direction substantially perpendicular to a horizontal plane of the banquette and a second portion substantially parallel to the horizontal plane of the banquette and arranged at least partially underneath said banquette,
   wherein the second locking/unlocking mechanism includes an activation component arranged at an upper end of the first portion of the support and connected to a first axially movable part which, in the initial pivoting locked position of the second locking/unlocking mechanism, is engaged with a second part integral with the shelf, thus preventing any pivoting movement of the second part in relation to the first axially movable part, and
   wherein movement of the activation component induces axial movement of the first axially movable part and disengagement thereof from the second part, thus allowing said pivoting movement.

7. The aircraft subassembly according to claim 6, wherein the activation component is a push-button.

8. The aircraft subassembly according to claim 1, further comprising a support,
wherein the shelf is mounted on the support, and further comprising means for moving the support in translation in relation to the banquette.

9. The aircraft subassembly according to claim 8, wherein the shelf is mounted in a rotating manner in relation to the support.

10. The aircraft subassembly according to claim 8, wherein the support, projecting in a plane perpendicular to the longitudinal sides of the banquette, is L-shaped and comprises a first portion of elongated form along a direction substantially perpendicular to a horizontal plane of the banquette and a second portion substantially parallel to the horizontal plane of the banquette and arranged at least partially underneath said banquette.

11. The aircraft subassembly according to claim 8, wherein the means for moving the support in translation includes at least one rail set cooperating with a carriage component, and
wherein one of the at least one rail set and the carriage component is disposed on the support and the other of the at least one rail set and the carriage component is disposed on a fixed frame positioned underneath the banquette.

12. The aircraft subassembly according to claim 1, wherein the first locking/unlocking mechanism is arranged on a support, the support coupling the shelf to the banquette.

13. The aircraft subassembly according to claim 1, further comprising a support,
wherein the first locking/unlocking mechanism comprises at least one movable locking device fastened on a first portion of the support and which, in the initial translational locked position, engages with a complementary device integral with a fixed frame, thereby preventing the translational movement of the support along the one of the two longitudinal sides of the banquette.

14. The aircraft subassembly according to claim 13, wherein the first mechanism further comprises a working device arranged on a second portion of the support that is connected to the first locking/unlocking mechanism by a set of movable parts, activation of the working device from a first position to a second position inducing movement of the set of movable parts and disengagement of the at least one movable locking device from the complementary device.

15. The aircraft subassembly according to claim 14, wherein movement of the working device is along an elongated direction of the first portion of the support.

16. The aircraft subassembly according to claim 14, wherein the working device comprises a sliding collar surrounding the first portion of the support.

17. The aircraft subassembly according to claim 1, wherein the shelf comprises two demi-trays linked together by a hinge such that the two demi-trays are arranged one above the other in a folded-up position of the shelf.

18. An aircraft comprising at least one aircraft subassembly according to claim 1.

19. An aircraft subassembly, comprising:
a banquette for a passenger, said banquette being dimensioned and configured to receive said passenger in a lying-down position on a horizontal top surface of said banquette, said banquette defining two longitudinal sides parallel to each other and two transverse sides parallel to each other, said longitudinal sides being longer than said transverse sides;
a shelf mechanically coupled to said banquette, said shelf having, at least in an open position of said shelf, a tray surface oriented horizontally;
means for moving the shelf with a translational movement along one of the two longitudinal sides of the banquette while said tray surface is oriented horizontally,
wherein the shelf comprises two demi-trays linked together by a hinge such that the two demi-trays are arranged one above the other in a folded-up position of the shelf, and
wherein at least one dimension of one of the two demi-trays is less than a corresponding dimension of the other of the two demi-trays.

20. An aircraft subassembly, comprising:
a banquette for a passenger, said banquette being dimensioned and configured to receive said passenger in a lying-down position on a horizontal top surface of said banquette, said banquette defining two longitudinal sides parallel to each other and two transverse sides parallel to each other, said longitudinal sides being longer than said transverse sides;
a shelf mechanically coupled to said banquette, said shelf having, at least in an open position of said shelf, a tray surface oriented horizontally;
means for moving the shelf with a translational movement along one of the two longitudinal sides of the banquette while said tray surface is oriented horizontally,
wherein the shelf comprises two demi-trays linked together by a hinge such that the two demi-trays are arranged one above the other in a folded-up position of the shelf, and
wherein each of the two demi-trays includes
a straight side along which a hinge is arranged, and
a partially straight side disposed opposite the straight side, the partially straight side having two opposite ends, and
wherein each end of the partially straight opposite sides is rounded with a radius of curvature, the radius of curvature of at least one of the ends of one of the two demi-trays being greater than the radius of curvature of a corresponding end of the other of the two demi-trays disposed opposite each other in the folded-up position of the shelf.

* * * * *